United States Patent Office 2,737,064
Patented Mar. 6, 1956

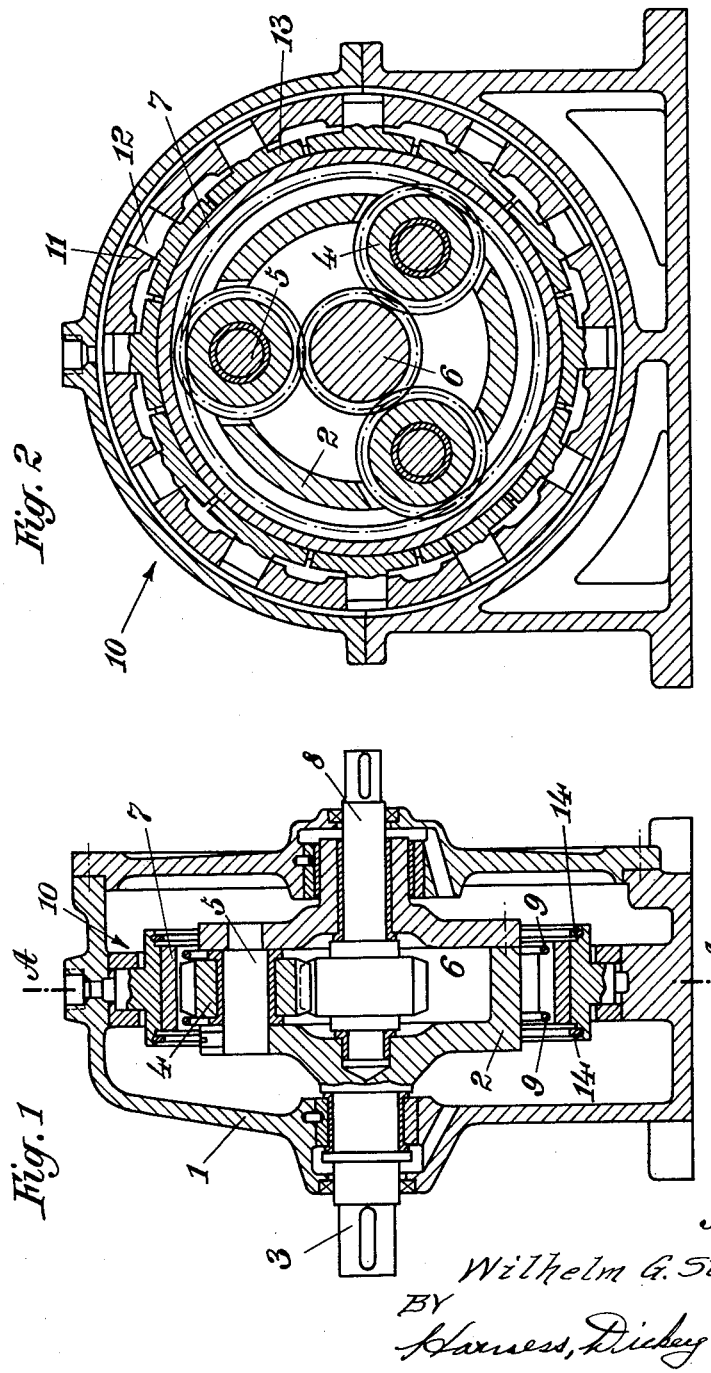

2,737,064

EPICYCLIC CONTROL GEAR

Wilhelm G. Stoeckicht, Munich-Solln, Germany

Application February 28, 1951, Serial No. 213,235

Claims priority, application Germany March 6, 1950

16 Claims. (Cl. 74—785)

The construction of epicyclic gears that can be engaged or disengaged by braking or releasing a central wheel, that is to say, a sun wheel or an annulus co-axial therewith, is known. Such arrangements are frequently employed for instance in epicyclic change-speed gears and in reversing gears.

On the other hand, it is known to construct epicyclic gears in which one or two central gears, for the purpose of equalising the load on the planet pinions, are made self-adjusting, for instance by connecting the central wheel with the member receiving its torque by means of a jointed coupling.

It is further known so to construct and dimension the central wheels of epicyclic gears that the elastic deformations arising from the action of the tooth pressures are adapted to compensate for the unavoidable errors of engagement of the gear, thereby likewise rendering possible a uniform distribution of the load amongst the planet pinions.

The object of the present invention is to construct epicyclic control gears in such a way that the automatic equalization of load between the planet pinions is insured without additional constructional elements being needed for this purpose. According to the invention this is effected in such a way that the central wheel to be braked is not supported by bearings but its position is determined only by the engagement of its teeth with those of the planet wheels, and it is braked in such a way that even when it is engaged, neither the automatic central positioning of the central wheel nor the elastic deformations thereof are hindered.

The result of this is not only that the gear, without additional constructional expenditure, obtains the automatic equalization of load that is necessary for its satisfactory working, but also, on account of the absence of the bearing of the central wheel to be braked, that a constructional form of hitherto unequalled simplicity is provided for epicyclic control gears.

Some forms of construction of the invention are illustrated by way of example in the accompanying drawings, in which:

Figure 1 shows a longitudinal section through a gear constructed according to the invention;

Figure 2 shows a section through this gear on the plane A—A in Figure 1; and

Figure 3:
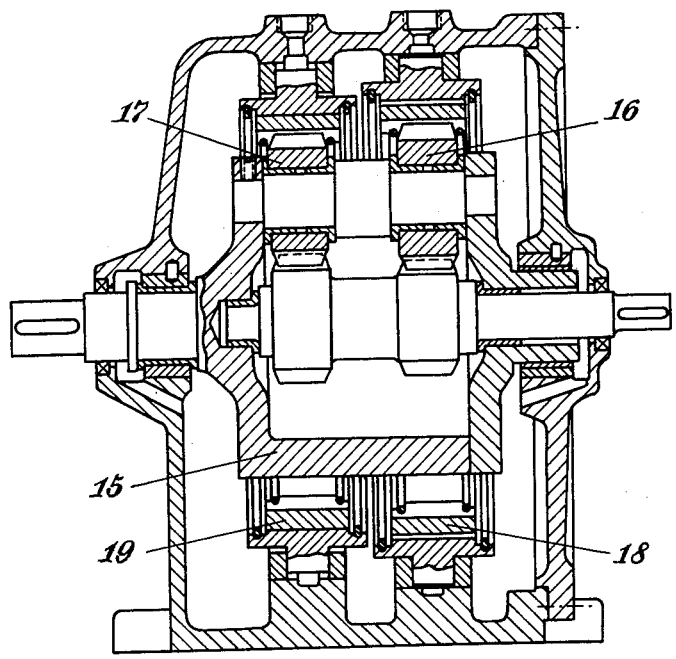
Figure 3 shows in longitudinal section a gear including two epicyclic sets.

In a casing 1 of the first embodiment is rotatably supported a planet-carrier 2, which is either integral with or connected torsionally fast with one gear shaft 3. In the planet-carrier 2 the planet pinions 4 are rotatably supported upon pivots 5. In general a gear is provided with three or more planet pinions. The teeth of the planet pinions 4 mesh on the one hand with the inner central wheel or sun wheel 6, and on the other hand with the outer central wheel or annulus 7. The inner central wheel 6 is connected torsionally fast with the second gear shaft 8, which is rotatably supported in the planet-carrier 2. The outer central wheel 7 is not supported by bearings at all; it is merely guided by the engagement of its teeth with those of the planet pinions 4. Two abutment rings 9 are provided, which are merely for the purpose of preventing lateral displacements of this central wheel. The outer central wheel 7 can be held fast or liberated by means of a braking appliance 10. Figures 1 and 2 show the central wheel being held fast by the braking means.

As shown in Figure 2, the planet-carrier 2 carries three planet pinions 4, which are mounted on the pivots 5, and which mesh on the one hand with the teeth of the inner central wheel 6 and on the other hand with those of the outer central wheel 7. This outer central wheel is surrounded by the braking means 10, which consists of a rather large number of radially arranged pressure cylinders 11, twelve in number in the present example, with pressure pistons 12. Each pressure piston 12 acts upon a brake shoe 13. The brake shoes 13 are pressed outwards by resilient rings 14 (Figure 1). The pressure spaces of the cylinders 11 are in communication with one another, and can be supplied by means of a pressure liquid or compressed air.

The method of operation of the invention will now be described: When the braking appliance 10 is released, the outer central wheel 7 can revolve freely, so the connection between the two gear shafts 3 and 8 is released. Thus if 8 is the driving shaft and 3 the driven shaft, the shaft 8 can revolve freely while the shaft 3 is stationary. If the shaft 3 is now to be driven by means of the epicyclic gear, the braking appliance 10 is applied, whereby the outer central wheel 7 is held fast, the driving of the shaft 3 then being effected in a known manner through the epicyclic gear. The braking appliance 10 is applied by admitting air or liquid under pressure to the pressure cylinders 11, whereby the pistons 12, with the brake shoes 13, are pressed by the air pressure or liquid pressure against the outer central wheel and hold the latter fast. Since the pressure on all the brake shoes is the same, no transverse force is exerted upon the central wheel 7, such as might displace it from its central position determined by the forces applied to its teeth. The central wheel 7 will thus maintain its correct mid position during the entire period of its operation. In consequence of the provision of numerous brake shoes which are radially displaceable independently of one another, the central wheel 7 is capable of undergoing elastic deformations under the action of the radial components of the tooth pressure, whereby in a known manner it is rendered capable of compensating for the unavoidable slight errors of engagement, thus ensuring a uniform distribution of load amongst the planet pinions.

In Figures 1 and 2 the application of the invention to an individual set of sun and planet wheels is illustrated. Frequently the invention will be employed in those gears which comprise a plurality of epicyclic sets. Such a constructional example, which shows an epicyclic change-speed gear with two sets of sun and planet wheels is represented in Figure 3. Here, in a known manner, on a planet-carrier 15, two sun-and-planet sets 16 and 17 are arranged, which yield different velocity ratios. By selectively braking one of the outer central wheels 18 and 19 the gear can be operated with different velocity ratios.

The invention is not restricted to the use of pressure liquid or compressed air for actuating the brake. The individual brake shoes may for instance alternatively be positioned by spring pressure.

What I claim is:

1. In an epicyclic gear mechanism, a driving shaft, a driven shaft, a first central gear, a second central gear, a spider for rotatably supporting a set of planet gears on their individual axes, the spider being operatively connected with one of said shafts, said first central gear being operatively connected with the other of said shafts, means supporting said first central gear, said spider, and their connected shafts for coaxial rotation, said second central gear being rotatably supported solely by its meshing engagement with the planet gears of said spider, means for selectively applying radial braking forces to said second central gear to permit or retard said rotation, and means for distributing said braking forces so as to prevent interference with the position of said second central gear as determined by its meshing engagement with said planet gears.

2. The combination according to claim 1, said braking and distributing means comprising a relatively large number of braking members simultaneously engageable with said second central gear, said braking members being radially movable independently of one another, and means for applying equal actuating pressures on all of said braking members.

3. The combination according to claim 2, said pressure applying means including means for applying a fluid under pressure to all of said braking members simultaneously.

4. The combination according to claim 2, further provided with resilient means for urging said braking members in a direction opposite to that of said pressure applying means.

5. In a epicyclic gear mechanism, a driving shaft, a driven shaft, a sun gear, a ring gear, a spider for rotatably supporting a set of planet gears on their individual axes, the spider being operatively connected with one of said shafts, said sun gear being operatively connected with the other of said shafts, means for supporting said sun gear, said spider, and their connected shafts for coaxial rotation, said ring gear being rotatably supported solely by its meshing engagement with the planet gears of said spider, means for selectively applying radial braking forces to said ring gear to permit or retard said rotation, and means for distributing said braking forces so as to prevent interference with the position of said ring gear as determined by its meshing engagement with said planet gears.

6. The combination according to claim 5, said braking and distributing means including a relatively large number of braking members simultaneously engageable with said ring gear, said braking members being radially movable independently of each other, and means for applying equal braking pressures to all of said braking members.

7. The combination according to claim 6, said pressure applying means including means for applying fluid pressure simultaneously to all of said braking members.

8. The combination according to claim 6, further provided with resilient means for urging all of said braking members simultaneously in a direction opposite to that of said pressure applying means.

9. The combination according to claim 8, said resilient means comprising a resilient ring engageable with all of said braking members.

10. In an epicyclic gear mechanism, a driving shaft, a driven shaft, a first central gear, a second central gear, a spider for rotatably supporting a set of planet gears on their individual axes, the spider being operatively connected with one of said shafts, said first central gear being operatively connected with the other of said shafts, means supporting said first central gear, said spider, and their connected shafts for coaxial rotation, said second central gear being supported solely by its meshing engagement with the planet gears of said spider, means for applying braking forces to said second central gear, means for distributing said braking forces so as to prevent interference with the position of said second central gear as determined by its meshing engagement with said planet gears, said braking and distributing means comprising a relatively large number of braking members simultaneously engageable with said second central gear, said braking members being radially movable independently of one another, and means for applying equal actuating pressures on all of said braking members.

11. The combination according to claim 10, said pressure applying means including means for applying a fluid under pressure to all of said braking members simultaneously.

12. The combination according to claim 10, further provided with a resilient means for urging said braking members in a direction opposite to that of said pressure applying means.

13. In an epicyclic gear mechanism, a driving shaft, a driven shaft, a sun gear, a ring gear, a spider for rotatably supporting a set of planet gears on their individual axes, the spider being operatively connected with one of said shafts, said sun gear being operatively connected with the other of said shafts, means for supporting said sun gear, said spider, and their connected shafts for coaxial rotation, said ring gear being supported solely by its meshing engagement with the planet gears of said spider, means for applying braking forces to said ring gear, means for distributing said braking forces so as to prevent interference with the position of said ring gear as determined by its meshing engagement with said planet gears, said braking and distributing means including a relatively large number of braking members simultaneously engageable with said ring gear, said braking members being radially movable independently of each other, and means for applying equal braking pressures to all of said braking members.

14. The combination according to claim 13, said pressure applying means including means for applying fluid pressure simultaneously to all of said braking members.

15. The combination according to claim 13, further provided with resilient means for urging all of said braking members simultaneously in a direction opposite to that of said pressure applying means.

16. The combination according to claim 15, said resilient means comprising a resilient ring engageable with all of said braking members.

References Cited in the file of this patent

UNITED STATES PATENTS

| | | |
|---|---|---|
| 2,002,951 | Levin et al. | May 28, 1935 |
| 2,247,839 | Halford et al. | July 1, 1941 |
| 2,444,363 | Newcomb | June 29, 1948 |
| 2,464,494 | Ferreira | Mar. 15, 1949 |
| 2,464,960 | Arnold | Mar. 22, 1949 |
| 2,500,393 | Williams | Mar. 14, 1950 |

FOREIGN PATENTS

| | | |
|---|---|---|
| 693,212 | Germany | July 4, 1940 |